United States Patent [19]

Hyde et al.

[11] 4,063,217
[45] Dec. 13, 1977

[54] BACKUP ALARM ACTIVATION MECHANISM FOR POWER SHIFT TRACTORS

[75] Inventors: Michael B. Hyde; Raymond A. Bianchi, both of Pekin, Ill.

[73] Assignee: Caterpillar Tractor Co., Peoria, Ill.

[21] Appl. No.: 682,423

[22] Filed: May 3, 1976

[51] Int. Cl.² ............................................. B60Q 1/22
[52] U.S. Cl. ........................................ 340/70; 340/91;
200/61.85; 200/61.88; 200/61.91
[58] Field of Search ....................... 340/70, 66, 67, 91,
340/95; 240/7.1 F; 200/61.28, 61.85, 61.88;
307/10 LS; 200/61.91

[56] References Cited

U.S. PATENT DOCUMENTS

| 2,829,213 | 4/1958 | Brett | 340/70 |
|---|---|---|---|
| 3,437,994 | 4/1969 | Forsberg | 340/70 |
| 3,629,819 | 12/1971 | Peterson | 340/70 |
| 3,827,024 | 7/1974 | Anderson | 340/70 |

Primary Examiner—John W. Caldwell, Sr.
Assistant Examiner—Donnie L. Crosland
Attorney, Agent, or Firm—Wegner, Stellman, McCord, Wiles & Wood

[57] ABSTRACT

An apparatus for signalling an intended reverse operation of a mechanism having a shift lever selectively positionable in forward, neutral, and reverse positions prior to placement of the shift lever in the reverse position for effecting reverse operation. The apparatus includes an activating structure responsive to movement of the shift lever in the neutral position toward the reverse position for activating the control of a signalling device prior to reverse operation of the mechanism. The apparatus is adapted for use in signalling the backup operation of a vehicle, such as a tractor, before the tractor starts in a reverse direction motion.

8 Claims, 2 Drawing Figures

U.S. Patent    Dec. 13, 1977    4,063,217
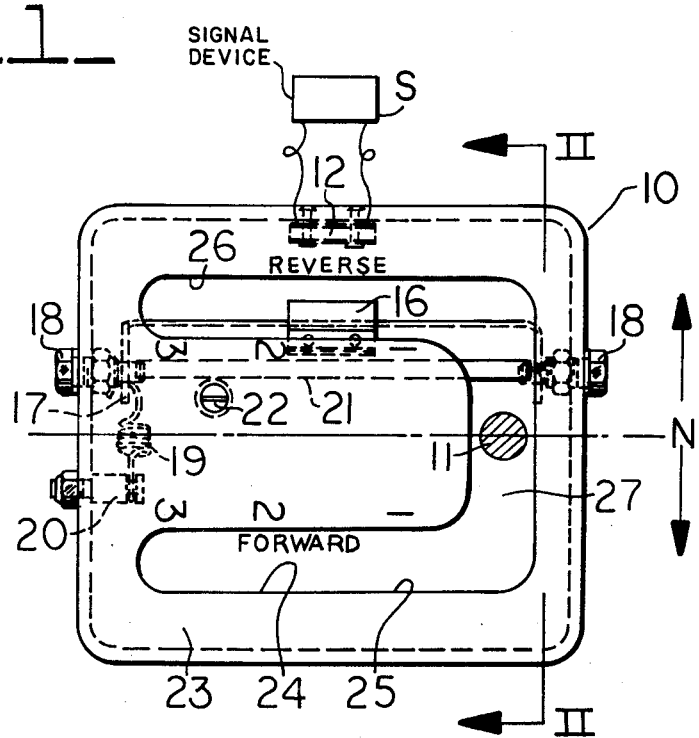
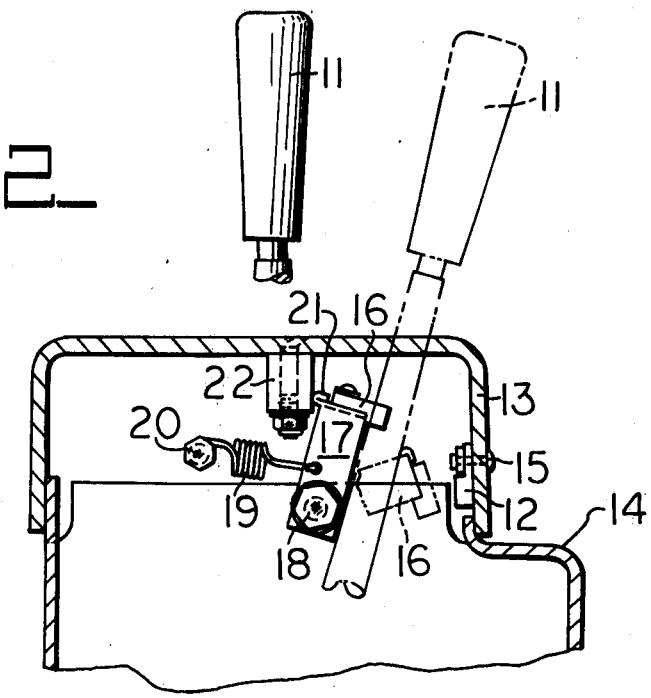

BACKUP ALARM ACTIVATION MECHANISM FOR POWER SHIFT TRACTORS

BACKGROUND OF THE INVENTION

1. Field of the Invention

This invention relates to reversibly operable vehicles and in particular to means for signalling a back-up of the vehicle prior to the initiation of back-up motion.

2. Description of the Prior Art

One conventional method of signalling the back-up of a vehicle, such as a truck or the like, is to provide a signal-operating switch engageable by the gearshift levers of the truck when they are shifted to a reverse drive position. An illustrative form of such a back-up safety signal is shown in U.S. Pat. No. 2,829,213 of William J. Brett. Brett teaches the provision of the signal control in the transmission housing comprising switch operating means for operating a switch carried by the housing for operation when the control "is moved into the position in which the transmission is in reverse drive".

Seiji Kirimoto et al, in U.S. Pat. No. 3,439,324, show a backup warning device for a vehicle which is actuated by a gearshifting linkage when the control is placed in reverse. In the Kirimoto et al patent, a switch is closed by the shifting of the gearshift lever to the reverse position.

Another form of motion alarm for vehicles is illustrated in U.S. Pat. No. 3,827,024 of Arlynn W. Anderson et al, which patent is owned by the assignee hereof. In the Anderson et al patent, a motion alarm is provided which is actuated by elements of the vehicle drive system which not only operates the audible alarm when the vehicle is deliberately backed up, but also operates the alarm as a result of unexpected motion occurring in either direction as when the vehicle has been parked and is unattended. A logic circuit is provided to prevent operation of the alarm when forward motion of the vehicle is deliberately intended. When the shifting lever is shifted to the reverse position, a magnet is caused to close a reed switch to initiate sounding of the audible signal. In addition, the control activates the signal device by other operating conditions of the vehicle.

SUMMARY OF THE INVENTION

The present invention comprehends an improved signalling apparatus for use with a reversible vehicle which is caused to provide a signal of the operator's intention of putting the vehicle into reverse operation so that a warning is provided prior to any actual reverse movement of the vehicle.

The activating means is provided in the gear selector console so as to be operable directly by a shifting of the manually operable gearshift lever.

The control means is extremely simple and economical of construction and may be readily assembled and disassembled.

The control means may be readily installed in existing shift consoles to provide improved functioning of existing vehicle structures.

The control is arranged to have a fail-safe functioning for further improved safety.

The control is extremely simple so as to minimize the need for adjustment and minimize servicing while yet providing a long useful life thereof.

In the illustrated embodiment, the activating means for operating the signalling device control is made to be responsive to movement of the gearshift lever in the neutral position toward the reverse position for activating the control prior to a reverse operation of the vehicle.

The actuating means is arranged to maintain operation of the signalling device in all locations of the gearshift lever effecting reverse operation of the vehicle.

In the illustrated embodiment, the actuating means comprises a switch actuator and a carrier movably supported adjacent the shift lever for carrying the switch actuator suitably to operate the control switch of the signalling device.

The carrier may be swingably supported adjacent the shift lever and may be biased against the shift lever suitably to prevent operation of the signalling device when the shift lever is in the neutral position.

The control may comprise a reed switch and the actuating means may comprise a magnet for selectively actuating the switch.

The control means may be removably mounted within the housing receiving an inner portion of the gearshift lever and, more specifically, threaded securing means may be provided for removably mounting the control means and actuating means within the housing.

Thus, the signalling control of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a plan view of a signalling apparatus embodying the invention; and

FIG. 2 is a fragmentary vertical section taken substantially along the line 2—2 of FIG. 1.

DESCRIPTION OF THE PREFERRED EMBODIMENT

In the exemplary embodiment of the invention as disclosed in the drawing, an improved apparatus generally designated 10 is disclosed for operating a signalling device S for signalling an intended reverse operation of a mechanism. The mechanism may include a shift lever 11 selectively positionable in a forward, a neutral, and a reverse position. The apparatus is arranged to provide the warning signal prior to placement of the shift lever in the reverse position for effecting reverse operation of the mechanism.

Apparatus 10 includes a control switch 12 mounted to the inside of a cover 13 of a housing generally designated 14, by a suitable securing means, such as screws, 15. Switch 12 may comprise a reed switch adapted to be actuated by a suitable magnet 16. Magnet 16 is mounted to a carrier 17 which is pivotally mounted to the housing 14 by suitable pivots 18 and is normally biased to an upwardly extending position, as shown in full lines in FIG. 2, by a suitable tension spring 19. As shown, spring 19 is connected between the carrier 17 and a retainer 20 secured to the cover 13. Movement of carrier 17 pivotally away from switch 12 is limited by the abutment of a bumper 21 with a stop 22 carried on cover 13, as shown in FIG. 2.

As best seen in FIG. 1, housing 14 is provided with a guide plate 23 having a U-shaped slot generally designated 24 including a first leg portion 25, an opposite parallel leg portion 26, and an interconnecting bight portion 27. The width of the slot is approximately equal to the outer diameter of the shift lever 11, as seen in FIG. 1, so as to guide the shift lever in a U-shaped path in controlling the operation of the drive mechanism (not shown).

Movement of the shift lever 11 into leg 25 may effect a forward operation of the mechanism, whereas movement of the lever into leg 26 may effect a reverse operation of the mechanism. Thus, when the lever is in the bight portion 27 of slot 24, the mechanism may be in a neutral condition.

Bumper 21 extends substantially the length of the carrier 17 between the pivots 18 at opposite sides of the housing 14, as best seen in FIG. 1. Thus, when the shift lever 11 is moved toward the reverse leg 26 while still in the bight portion 27 of the slot, the carrier bumper 21 is engaged by the lever and swung from the full line position toward the dotted line position shown in FIG. 2. Thus, the magnet 16 is caused to actuate the reed switch 12 to signal the intended placement of the shift lever into the reverse position, thereby providing a warning prior to the reverse operation of the mechanism. Upon movement of the shift lever into the slot leg 26, the lever may be moved lengthwise thereof while maintaining the magnet 16 in position to maintain the switch 12 closed. Thus, the shift lever may effectively shift gears in the reverse operation while maintaining the warning signal operative.

In the illustrated embodiment, the housing 14 comprises a gear selector console housing. The pivots 18, retainer 20, switch mounting means 15, and stop 22 may be threadedly secured to the housing 14, as shown in the drawing, to provide facilitated installation and servicing as desired.

Thus, in the use of the mechanism, the user may initiate a reverse operation by moving the handle 11 from the full line position of FIG. 2 toward the broken line position thereof. As the handle approaches the reverse position, actuation of the switch 12 provides a warning signal which will be maintained subsequently as long as the handle is disposed in the reverse position, i.e., anywhere along the length of slot leg 26. Thus, the warning signal is provided not only prior to the placement of the mechanism in reverse operation, but also during the reverse operation itself, and more specifically, in any of the different reverse speeds in which the mechanism may be placed.

Reversely, when the operator moves the handle 11 back to the neutral position at the center of bight portion 27 of slot 24, the warning signal is maintained until the mechanism is no longer in reverse operation so that the improved signalling apparatus of the present invention provides an overlap in the warning signal both prior to and subsequent to actual reverse operation of the mechanism.

The present apparatus may be installed in existing gearshift consoles with minor modification thereto. Thus, the apparatus of the present invention is adapted for facilitated modification of existing vehicle shift controls to provide the improved warning signal functioning.

The foregoing disclosure of specific embodiments is illustrative of the broad inventive concepts comprehended by the invention.

What is claimed is:

1. Apparatus for signalling an intended reverse operation of a mechanism having a shift lever selectively positionable in forward, neutral, and reverse positions prior to placement of the shift lever in the reverse position for effecting such reverse operation, said apparatus comprising: a signalling device; control means for operating said device to provide a warning signal; and activating means responsive to movement of said shift lever in the neutral position toward the reverse position for activating said control means to operate said signalling device prior to, during, and subsequent to reverse operation of the mechanism to forewarn of the reverse operation and to maintain the warning for a period of time after powered reverse operation is terminated.

2. The signalling apparatus of claim 1 wherein said shift lever is movable to a plurality of different locations while in said reverse position, said actuating means being further arranged to maintain operation of the signalling device in all said locations.

3. The signalling apparatus of claim 1 wherein said control means comprises a switch, and said actuating means comprises a switch actuator, and a carrier movably supported adjacent said shift lever and carrying said switch actuator.

4. The signalling apparatus of claim 1 wherein said control means comprises a switch, and said actuating means comprises a switch actuator, and a carrier swingably supported adjacent said shift lever and carrying said switch actuator.

5. The signalling apparatus of claim 1 wherein said control means comprises a switch, and said actuating means comprises a switch actuator, a carrier movably supported adjacent said shift lever and carrying said switch actuator, and means biasing said carrier against said shift lever to position said switch actuator to prevent operation of the signalling device when the shift lever is in said neutral position.

6. The signalling apparatus of claim 1 wherein said control means comprises a reed switch, and said actuating means comprises a magnet for selectively actuating said switch.

7. The signalling apparatus of claim 1 wherein said mechanism defines a gear selector console having a housing, said shift lever having a portion within said housing, and means are provided for removably mounting said control means and said actuating means within said housing for operation by said shift lever portion.

8. The signalling apparatus of claim 1 wherein said mechanism defines a gear selector console having a housing, said shift lever having a portion within said housing, and threaded securing means are provided for removably mounting said control means and said actuating means within said housing for operation by said shift lever portion.

* * * * *